United States Patent [19]
Stevenson et al.

[11] Patent Number: 6,047,786
[45] Date of Patent: Apr. 11, 2000

[54] ELECTRIC VEHICLE AND FRAME THEREFOR

[75] Inventors: Douglas B. Stevenson, Newport, R.I.; Peter S. Hughes, South Harwich, Mass.; James D. Baldwin, Smyrna, Ga.; Ronald G. Flanary; Martin C. Piedl, both of Blacksburg, Va.; Aidan J. Petrie, Providence, R.I.; Richard D. Moore, Fayetteville, Ga.

[73] Assignee: Vectrix Corporation, Newport, R.I.

[21] Appl. No.: 08/988,968

[22] Filed: Dec. 11, 1997

[51] Int. Cl.[7] .................................................. B60K 16/04
[52] U.S. Cl. ........................ 180/65.1; 280/781; 180/68.5
[58] Field of Search ................................... 180/220, 216, 180/312, 311, 65.8, 65.1, 68.5

[56] References Cited

U.S. PATENT DOCUMENTS

| | | | |
|---|---|---|---|
| 3,983,952 | 10/1976 | McKee | 180/65 R |
| 4,334,589 | 6/1982 | Asakura et al. | 180/219 |
| 4,557,345 | 12/1985 | Hamane et al. | 180/229 |
| 4,577,719 | 3/1986 | Nomura et al. | 180/219 |
| 4,678,223 | 7/1987 | Kishi et al. | 296/78.1 |
| 4,700,799 | 10/1987 | Kawano | 180/219 |
| 4,715,465 | 12/1987 | Takahashi et al. | 180/225 |
| 4,723,619 | 2/1988 | Yamamoto et al. | 180/219 |
| 4,781,264 | 11/1988 | Matsuzaki et al. | 180/219 |
| 4,830,135 | 5/1989 | Yamashita | 180/229 |
| 4,887,687 | 12/1989 | Asai et al. | 180/219 |
| 4,964,484 | 10/1990 | Buell | 180/219 |
| 4,989,665 | 2/1991 | Yamagiwa et al. | 164/363 |
| 5,179,868 | 1/1993 | Thibeault | 74/411.5 |
| 5,207,288 | 5/1993 | Ono | 180/220 |
| 5,238,267 | 8/1993 | Hutchison et al. | 280/781 |
| 5,375,677 | 12/1994 | Yamagiwa et al. | 180/219 |
| 5,513,721 | 5/1996 | Ogawa et al. | 180/220 |
| 5,613,569 | 3/1997 | Sugioka et al. | 180/68.5 |
| 5,647,450 | 7/1997 | Ogawa et al. | 180/220 |
| 5,743,347 | 4/1998 | Gingerich | 180/65.1 |
| 5,934,694 | 8/1999 | Schugt et al. | 280/33.991 |

FOREIGN PATENT DOCUMENTS

| | | | |
|---|---|---|---|
| 0311975 | 12/1989 | Japan | 180/311 |
| 0155885 | 6/1990 | Japan | 180/311 |

*Primary Examiner*—Mark T. Le
*Assistant Examiner*—Daniel Yeagley
*Attorney, Agent, or Firm*—Pennie & Edmonds LLP

[57] ABSTRACT

The present invention discloses an electric vehicle frame having a lower portion and an upper portion. The lower portion includes a base and integral sidewalls. The sidewalls extend from the base to form an open cavity. The upper portion detachably joins to the lower portion such that the upper portion covers the cavity and forms a frame assembly which defines an enclosed chamber therein. The strength of the assembly is substantially greater than the strength of each of the portions prior to being joined. The lower and upper portions are formed of cast aluminum. The present invention further includes a method of assembling an electric vehicle, which includes using the frame and a plurality of subassemblies, and the electric vehicle formed therefrom, particularly in the form of a motor scooter.

22 Claims, 12 Drawing Sheets

ELECTRIC VEHICLE AND FRAME THEREFOR

BACKGROUND OF THE INVENTION

1. Technical Field of the Invention

This invention relates to an electric vehicle, and more particularly to an electric vehicle frame and a method of assembling the electric vehicle using the frame and a plurality of subassemblies.

2. Background of the Invention

Electric vehicles are well-known forms of transportation. These vehicles can be classified as automobiles, motorcycles, and motor scooters. Automobiles are four-wheeled vehicles. Motorcycles are two-wheeled vehicles, which are straddled by the rider. Scooters are two or three-wheeled vehicles that have a step-through portion to facilitate mounting and seating of the rider. In the case of three-wheeled scooters, these may be useful as all-terrain vehicles due to the wide base the spaced rear wheels provide. One distinguishing characteristic, which separates motorcycles and scooters, is that scooters include the step-through portion, which is a gap in the vehicle body between the handlebars and the seat that allows riders to easily mount the scooter and sit thereon with their legs together in front of them. Motorcycles, on the other hand, have a continuous vehicle body, which forces the rider to sit with their legs apart straddling the vehicle body.

In an effort to decrease the impact of gas-powered vehicle emissions on the environment, electric motor scooters have been developed. These scooters generally include a tubular frame for supporting the components of the vehicle and a power unit. The power unit typically is a battery pack. These tubular frames are formed by welding steel pipe members into a unitary, skeletal structure. As disclosed in U.S. Pat. No. 5,613,569, a tubular frame supports a battery case underneath. A number of body panels are attached to the frame to completely conceal the frame and side portions of the battery case.

There are a number of drawbacks to this type of configuration. First, this frame is constructed of steel, which in order to provide sufficient structural strength significantly increases the weight of the vehicle. Vehicle weight reduction is critical in electrical vehicle applications, because maximizing the range of the scooter requires minimizing the weight. Therefore, it is desirable to construct the frame in such a manner that significantly reduces the vehicle weight.

Second, tubular frames require significant manual labor in order to join the pipe members together. Such labor intensive assembly methods are costly and undesirable. Third, the tubular frame and battery case disclosed in that patent requires an air exhaust device to move cooling air within the battery case to cool the batteries. This is undesirable since it adds complexity to the configuration and increases the vehicle weight.

U.S. Pat. No. 4,334,589 discloses a frame for a motorcycle. This patent discloses a shell type frame, which includes an upper half shell and lower half shell detachably joined together at the peripheral edges. The upper half shell includes a steering tube for receiving a steering assembly. A conventional gasoline engine is the power unit. The engine is connected to opposite sides of the shell so that the engine is a mechanical strength member. Once assembled, the front and rear of this frame are open to allow air to pass through the frame and cool the power unit. Motorcycles have acceleration and driving performance requirements that are largely different from motor scooters. For this and other reasons, the frame of that patent is not desirable for use in a motor scooter. First, the frame does not provide the necessary step-through portion required by scooter riders. Secondly, the frame does completely enclose the power unit from the environment. This is critical for electric vehicle applications, since exposure of the batteries to moisture can damage the power unit.

Therefore, an improved electric vehicle frame and more advantageous method of assembling an electric vehicle using the frame are sought. It is desirable that the frame be lightweight, yet still provide sufficient structural support for the vehicle. It is furthermore desired that the frame allow rapid yet simple assembly and construction of the vehicle while still protecting the power unit from weather.

SUMMARY OF THE INVENTION

These desirous and advantageous features are now provided by the present invention, which relates to an electric vehicle frame comprising a lower portion and an upper portion. The lower portion includes a base and integral sidewalls. The sidewalls extend from the base to form an open cavity. The upper portion detachably joins to the lower portion such that the upper portion covers the cavity and forms a frame assembly which defines an enclosed chamber therein. The strength of the assembly is substantially greater than the strength of each of the portions prior to being joined. According to another embodiment of the present invention, the base further includes a steering tube with a bore therethrough for receiving a steering subassembly.

Another embodiment of the present invention relates to a method of assembling an electric vehicle, which comprises providing the electric vehicle frame described above, providing a plurality of subassemblies and coupling the subassemblies to the frame to form the electric vehicle. The subassemblies include a steering subassembly, a drive subassembly including a motor, a motor controller subassembly for controlling the motor, and a power unit subassembly. Each subassembly is coupled to the frame to form the electric vehicle. In another embodiment, the method further includes placing the power unit subassembly in the open cavity of the lower portion of the frame and detachably joining the upper portion of the frame to the lower portion such that the power unit is encased therein.

Another embodiment of the present invention relates to an electric vehicle that comprises an electric vehicle frame and a plurality of subassemblies. The frame is the same as that which is described above. The subassemblies include the same types described above and each is detachably coupled to the frame to form the vehicle. Advantageously, the lower portion of the frame further comprises a steering tube having a bore therethrough for receiving the steering subassembly, and the steering subassembly includes a fork, a front wheel rotatably associated with the fork, handlebars, and a support member connecting the handlebars and fork, wherein and the support member extends through the bore such that the steering assembly is rotatably supported by the steering tube. The drive subassembly includes a motor and a rotatable rear wheel driven by the motor, and the sidewalls of the lower portion of the frame pivotally support the drive assembly such that the rear wheel is aligned with the front wheel. If desired, running boards can be detachably coupled to the upper portion of the frame, and a plurality of body panels detachably coupled to the frame, wherein the upper portion is configured and dimensioned to provide a step-through portion and the step-through portion of the frame is not obscured by the body panels. Also, two drive subassemblies can be pivotally supported by the lower portion of the frame so that the vehicle includes two rear wheels. When these subassemblies are coupled to the frame, a vehicle in the form of an electric motor scooter is obtained.

DETAILED DESCRIPTION OF THE PREFERRED EMBODIMENTS

Figure 1:
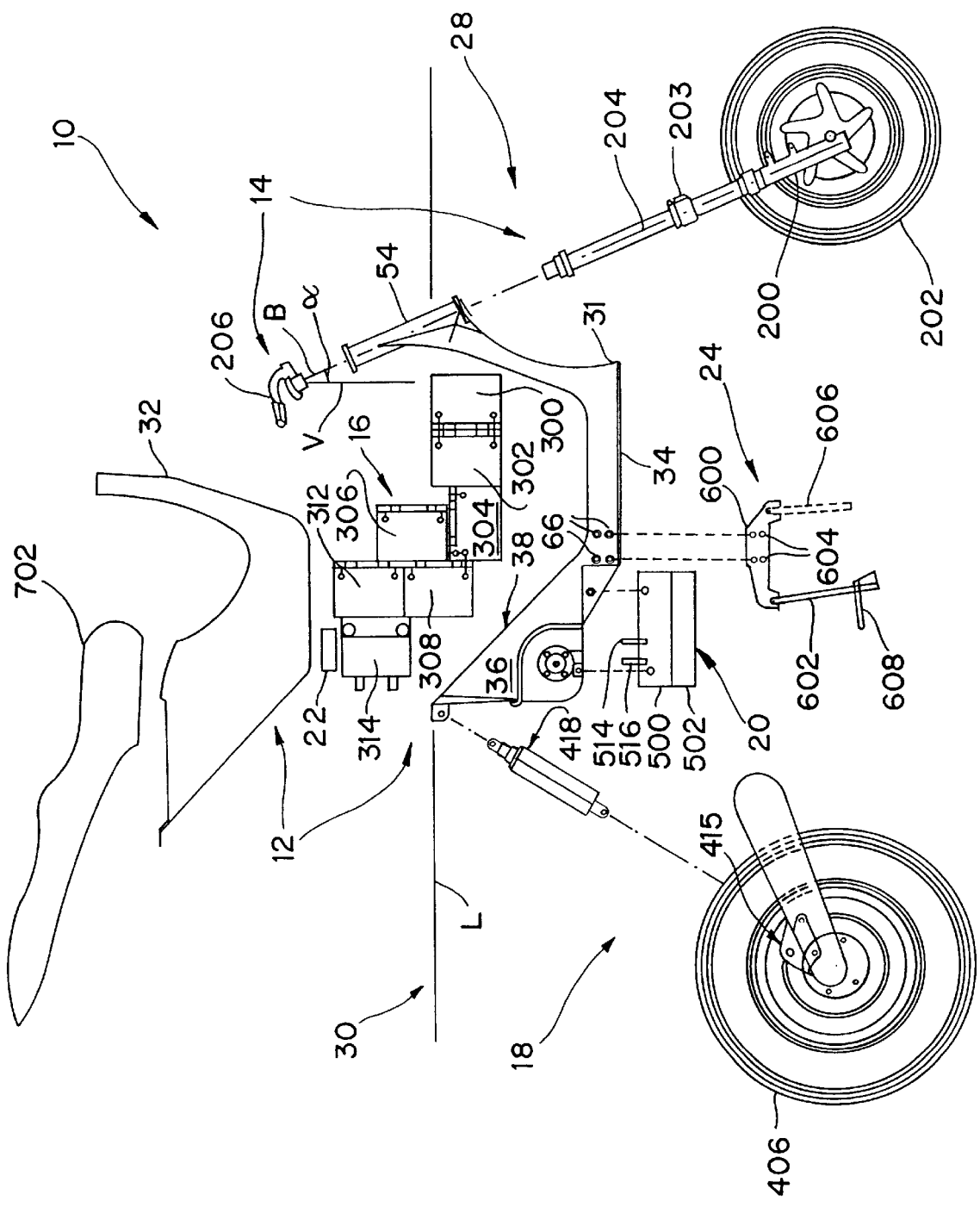
FIG. 1 is a partial, exploded, right-side view of the major components of an electric vehicle of the present invention.
Figure 2:
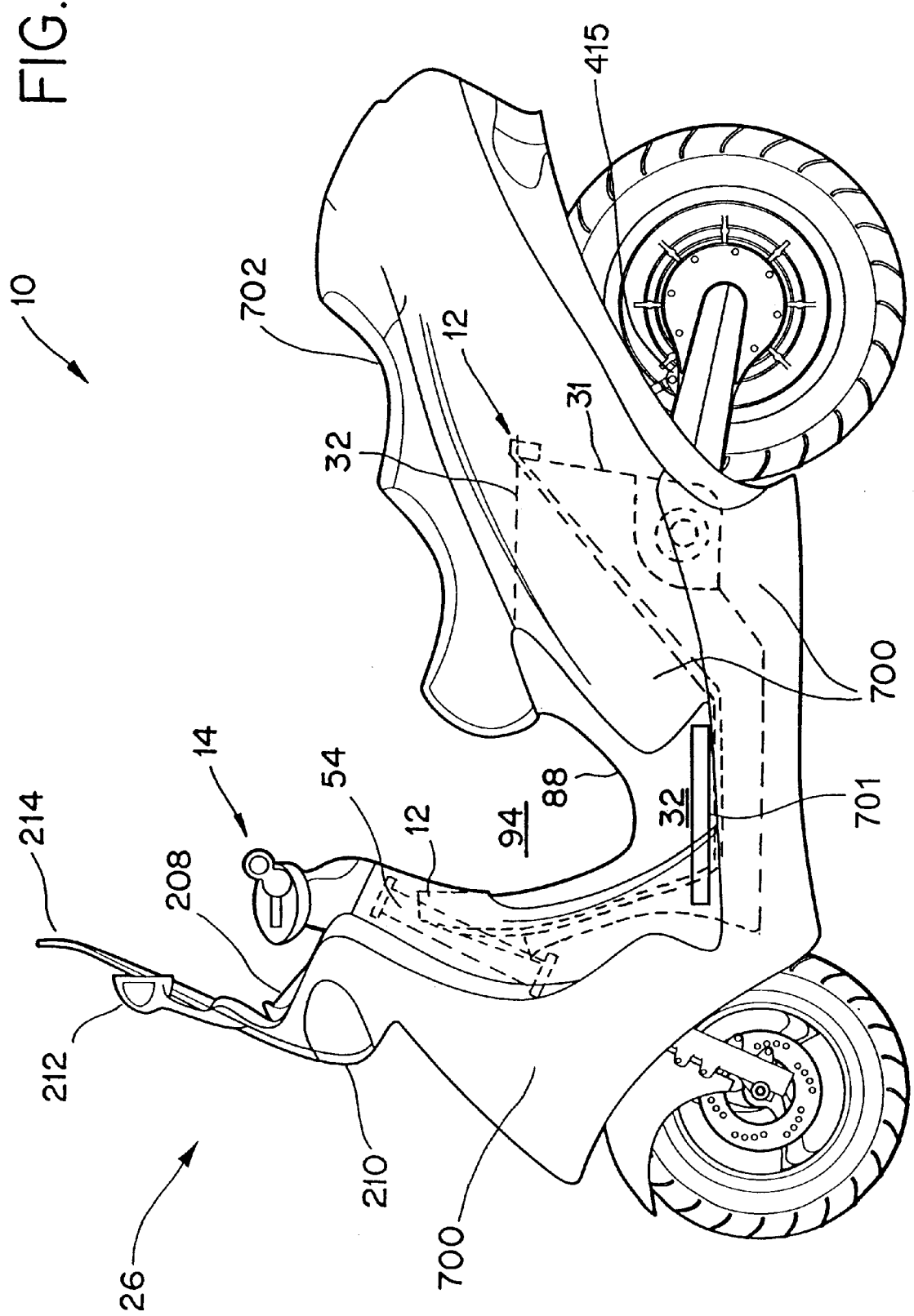
FIG. 2 is a left-side view of the electric vehicle of the present invention with a number of body panels thereon.

Referring to FIGS. 1 and 2, a two-wheeled electric motor scooter 10 includes a frame 12, which supports a plurality of modular subassemblies. The subassemblies include a steering subassembly 14, a power unit subassembly 16, a drive subassembly 18, a motor controller subassembly 20, a vehicle controller subassembly 22, a kick stand subassembly 24, and a body panel subassembly 26. The vehicle 10 further includes a front end 28, a rear end 30 spaced therefrom, and a longitudinally extending axis L extending between the ends 28 and 30.

Referring to FIG. 1, the electric vehicle frame 12 is a two-part assembly that performs many functions. It provides structural support for the components of the vehicle 10 under static and dynamic loads. It protects the power unit subassembly 16 and the controller subassemblies 20 and 22. Furthermore, the frame 12 acts as a heat sink. These function will be described in more detail below.

Figure 3:
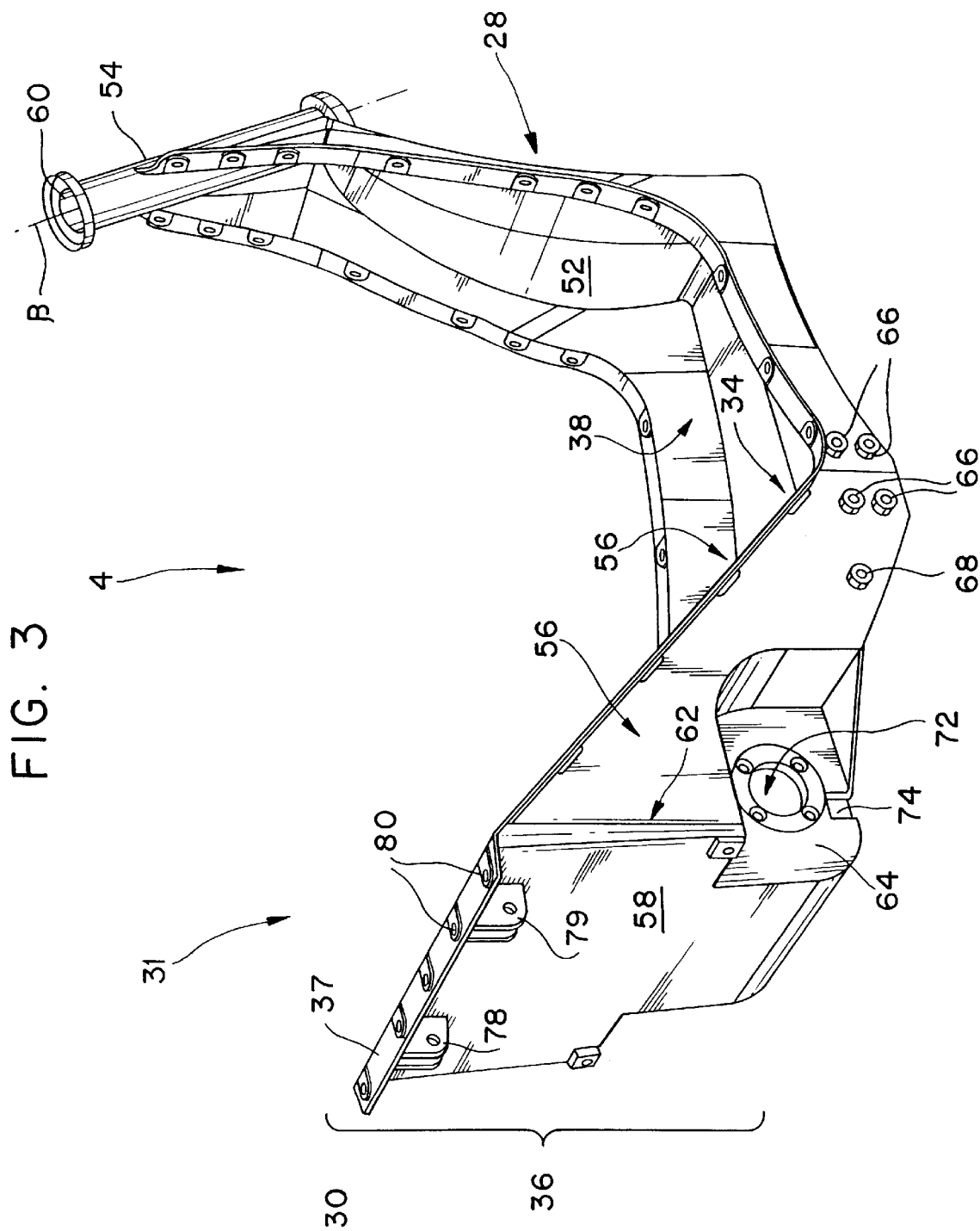
FIG. 3 is a top, rear, right-side perspective view of a lower portion of a frame of the present invention.

Referring to FIGS. 1 and 3, the frame 12 includes a lower portion 31 and an upper portion 32. The frame lower portion 31 includes a base 34, integral sidewalls 36, and a flange 37. The integral sidewalls extend from the base 34 to form an open cavity 38 therein.

Figure 4:
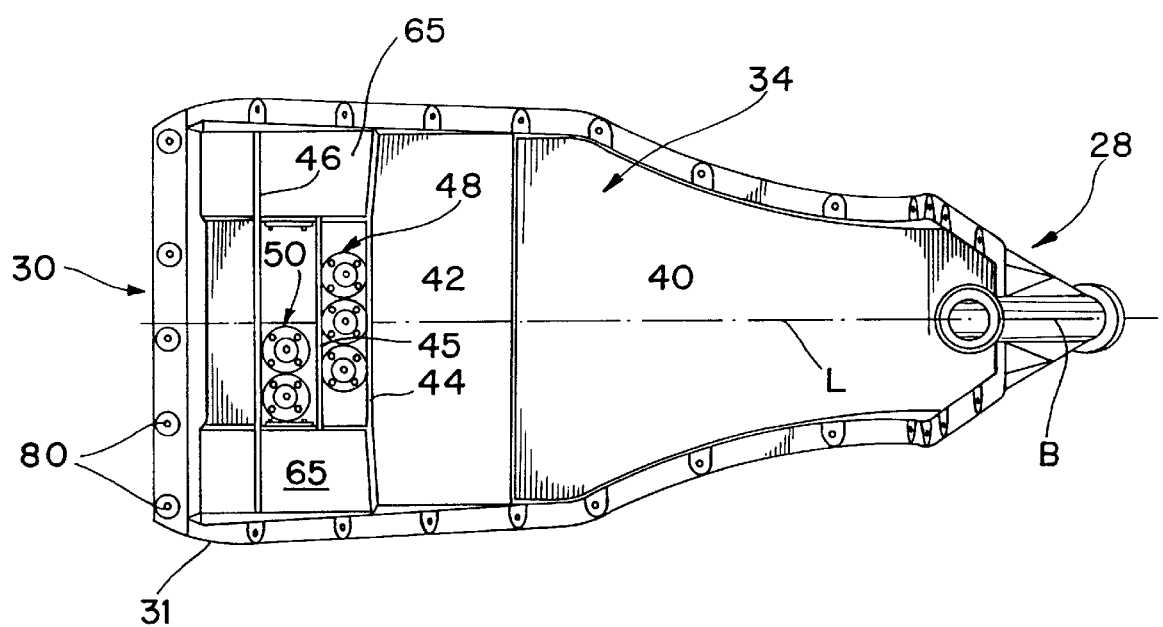
FIG. 4 is a top view of the lower portion of the frame of the present invention along arrow 4 of FIG. 3.
Figure 5:
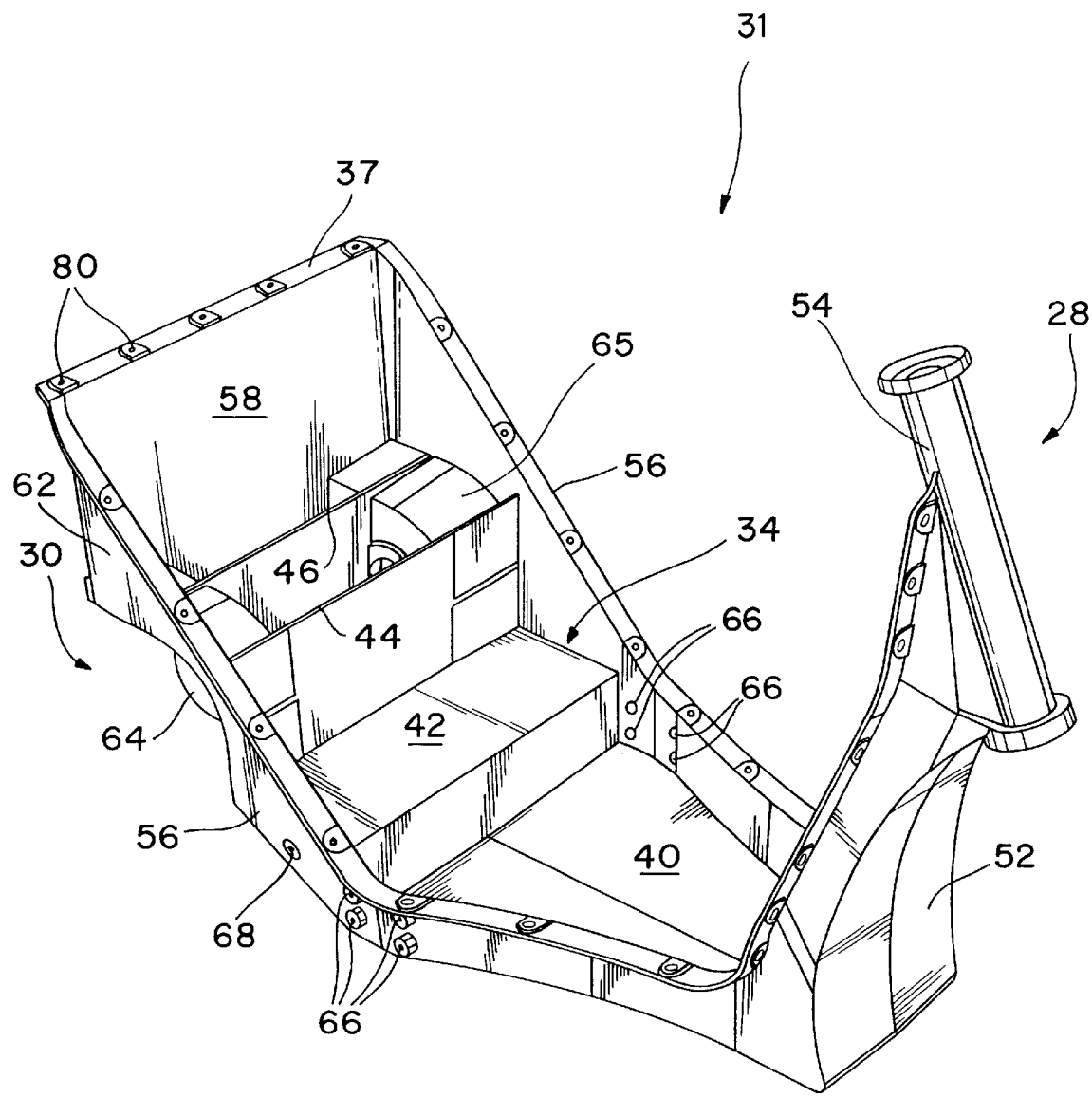
FIG. 5 is a top, front, right-side perspective view of the lower portion of the frame of the present invention.
Figure 6:
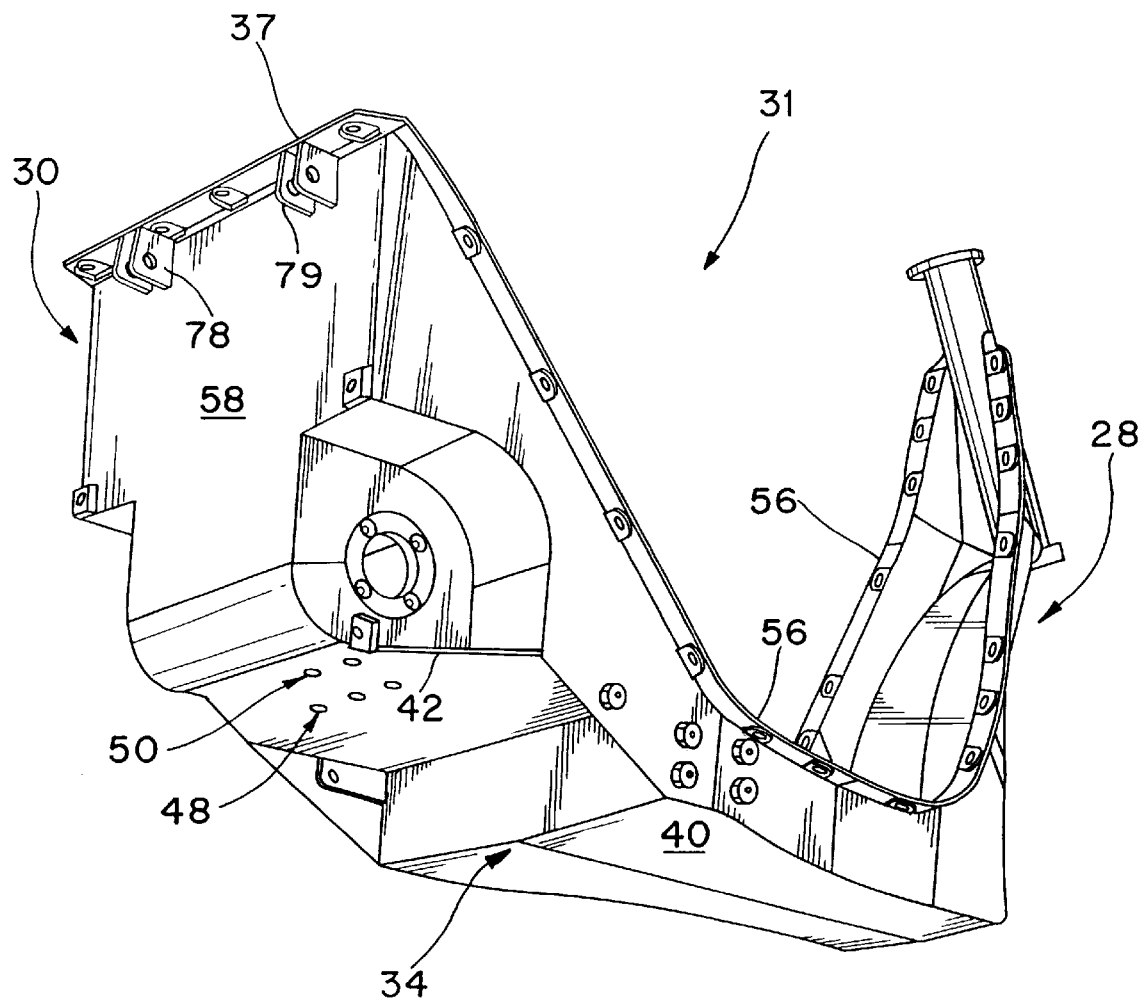
FIG. 6 is a bottom, rear, right-side perspective view of the lower portion of the frame of the present invention.

Referring to FIGS. 4 and 5, the base 34 of the lower portion includes a first portion 40 and a raised, second portion 42. The base 34 is stepped to separate the first portion 40 from the second portion 42, and elevate the second portion 42 above the first portion 40. The first portion 40 is narrow at the front end 28 and enlarges toward the rear end 30. Referring to FIG. 6, the second portion 42 is enlarged at the front end 28 and narrows toward the rear end 30.

Referring to FIGS. 4 and 5, the second portion 42 further includes three vertical walls 44, 45, and 46, and two longitudinally spaced rows of holes 48 and 50. The vertical walls 44 and 46 provide support for a portion of the power unit 16 (as shown in FIG. 1), and increase the structural rigidity of the frame lower portion 31. The shorter vertical wall 45 increases the structural rigidity of the frame lower portion 31. The first vertical wall 44 extends transversely between the sidewalls 36, and is disposed midway along the second portion 42. The second vertical wall 45 extends transversely between the sidewalls 36, and is spaced toward the rear end 30 from the first vertical wall 44. The third vertical wall 46 extends transversely between the sidewalls 36, and is spaced toward the rear end 30 from the second vertical wall 45.

Referring to FIG. 4, the first row of holes 48 is disposed between the first vertical wall 44 and the second vertical wall 45. The second row of holes 50 is disposed between the second vertical wall 45 and the third vertical wall 46. The first row 48 includes three spaced holes. The second row 50 includes two spaced holes.

Referring to FIG. 3, the sidewalls 36 include a front sidewall 52, a steering tube 54, intermediate sidewalls 56, and a rear sidewall 58. The front sidewall 52 extends upwardly from the front end of the base 34. In this embodiment, the front sidewall 52 has an outward curvature.

Referring to FIG. 3, the steering tube 54 extends from the free end of the front sidewall 52 and includes a bore 60, which extends therethrough. A centrally disposed axis B extends through the bore 60. As shown in FIG. 4, the axis B is aligned with the longitudinal axis L of the vehicle, such that the steering tube 54 is at the center of the frame lower portion 31. Referring to FIG. 1, a rake angle α extends between the axis B and a vertical line V. In this embodiment, the rake angle α is approximately 26°, so that the steering tube 54 has an angular offset from the base 34 of the frame.

Referring to FIGS. 3 and 5, each intermediate sidewall 56 is stepped to include an upper intermediate sidewall 62 and a lower intermediate sidewall 64.

Referring to FIGS. 3 and 5, the upper intermediate sidewall 62 extends longitudinally between the steering tube 54 and the rear sidewall 58 along the edges of the front sidewall 52 and the base 34.

Each upper intermediate sidewall 62 further includes a plurality of transversely extending holes therethrough. The first set of holes 66 are in two rows midway along the base 34. The remaining hole 68 is disposed toward the rear end 30 from the first set of holes 66.

Referring to FIGS. 3 and 5, each lower intermediate sidewall 64 is located inwardly of the upper intermediate sidewall 62, forming a shoulder 65 elevated above the second portion 42. Each lower intermediate sidewall 64 further includes a central transversely extending bore 72, and a bore 74 at the lower edge of lower intermediate sidewall 64.

Referring to FIG. 6, the rear sidewall 58 curves rearwardly and upwardly from the base 34 at the rear end 30. The rear sidewall 58 joins the rear ends of the intermediate sidewalls 56. The rear sidewall 58 includes a pair of brackets 78 and 79.

Figure 7:
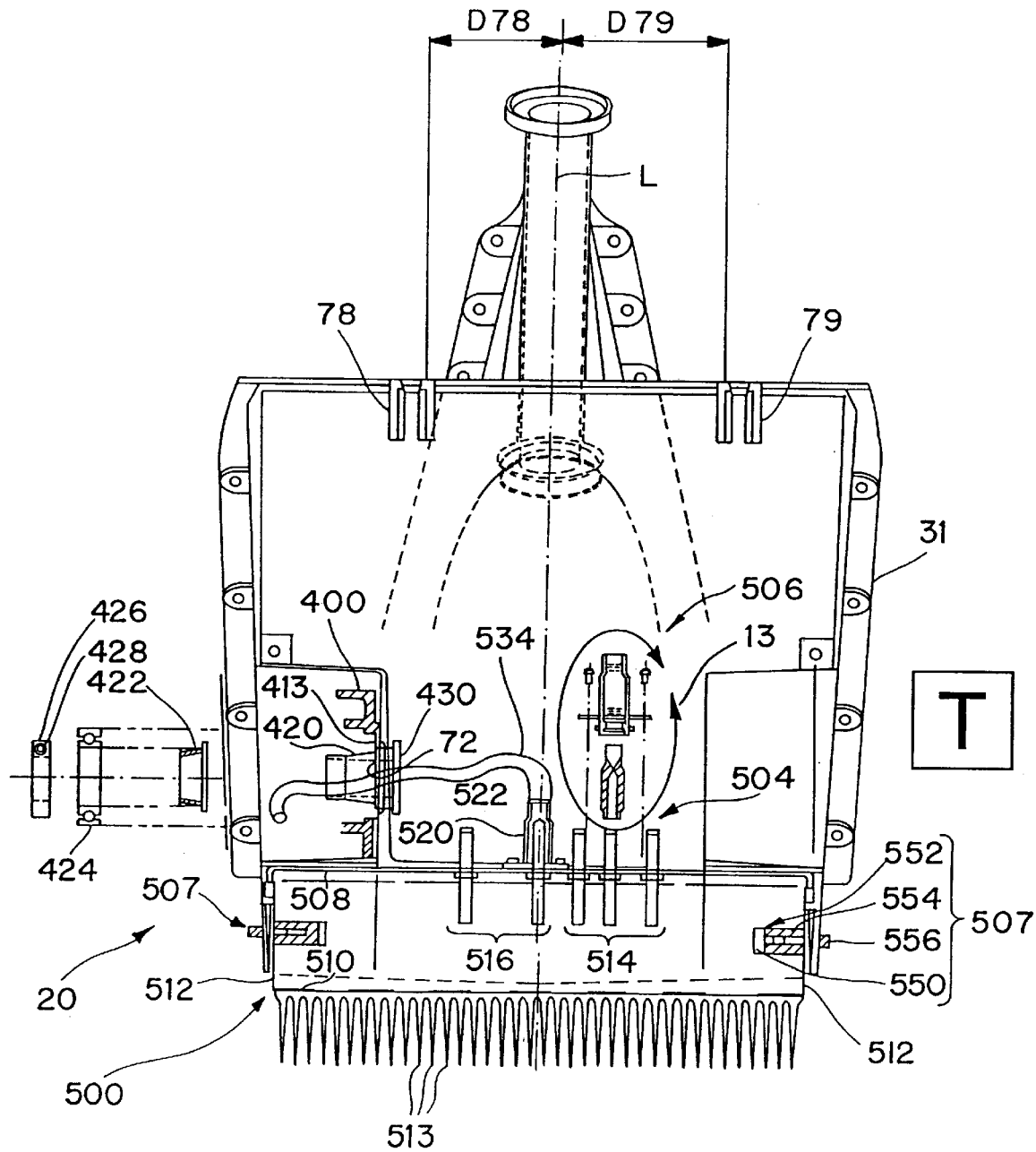
FIG. 7 is a rear view of a motor controller subassembly mounted to the frame of the present invention having a drive subassembly removed for clarity.
Figure 12:
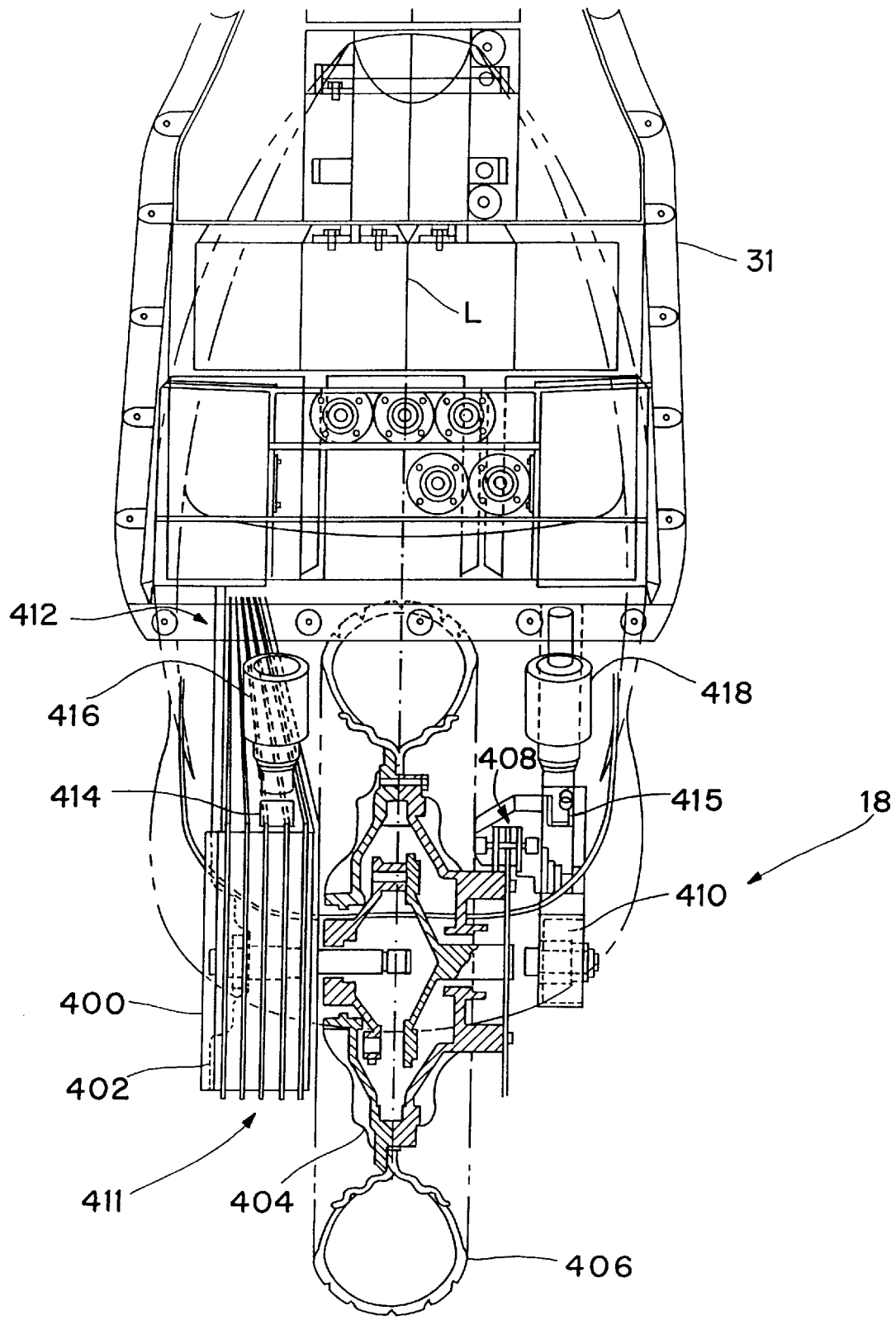
FIG. 12 is a top view of the frame of the present invention with the drive subassembly attached thereto.

The brackets 78 and 79 are disposed at spaced locations adjacent the free end of the rear sidewall 58. Each bracket 78 and 79 is adapted to receive an end of a shock absorber 416 and 418, respectively. (as shown in FIG. 12). Referring to FIG. 7, the bracket 78 is spaced from the longitudinal axis L a distance $D_{78}$. The bracket 79 is spaced from the longitudinal axis L a distance $D_{79}$. The distance $D_{79}$ is greater than the distance $D_{78}$ due to the configuration of the drive assembly and assures that the rear wheel 406 (as shown in FIG. 12) is aligned with the longitudinal axis L.

Referring to FIG. 5, the flange 37 extends outwardly along the periphery of the intermediate sidewall 56 and the rear sidewall 58. The flange 37 includes a plurality of holes 80 extending therethrough at spaced locations. Each hole 80 is reinforced by a surrounding build up of material.

Figure 8:
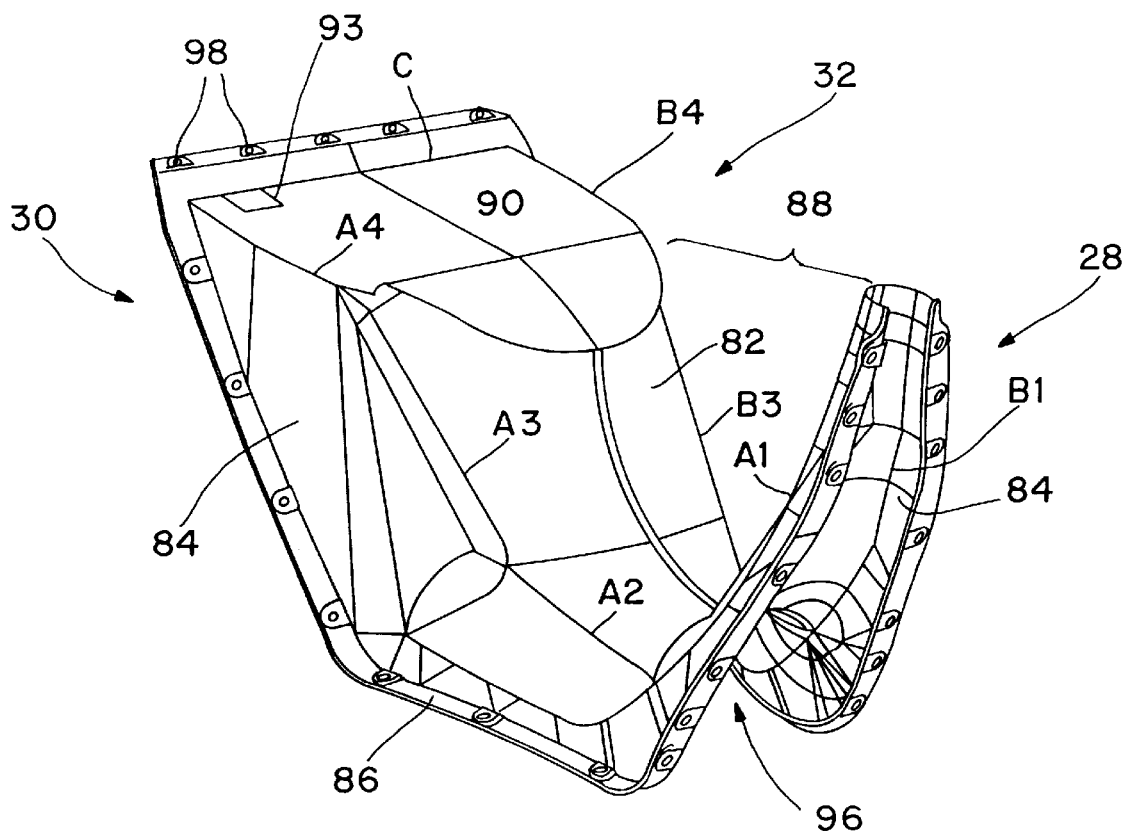
FIG. 8 is a top, front, right-side perspective view of an upper portion of the frame of the present invention.
Figure 9:
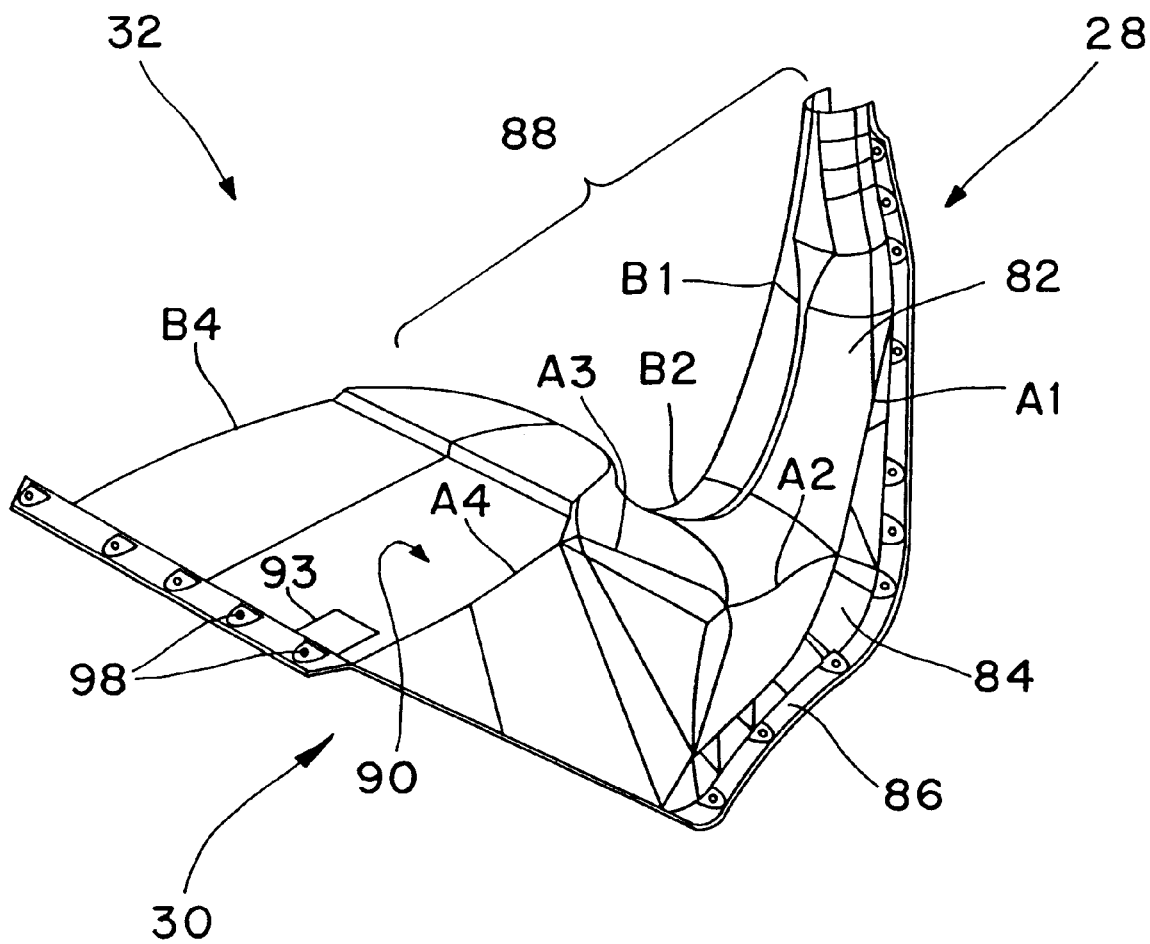
FIG. 9 is a top, rear, right-side perspective view of the upper portion of the frame of the present invention.
Figure 10:
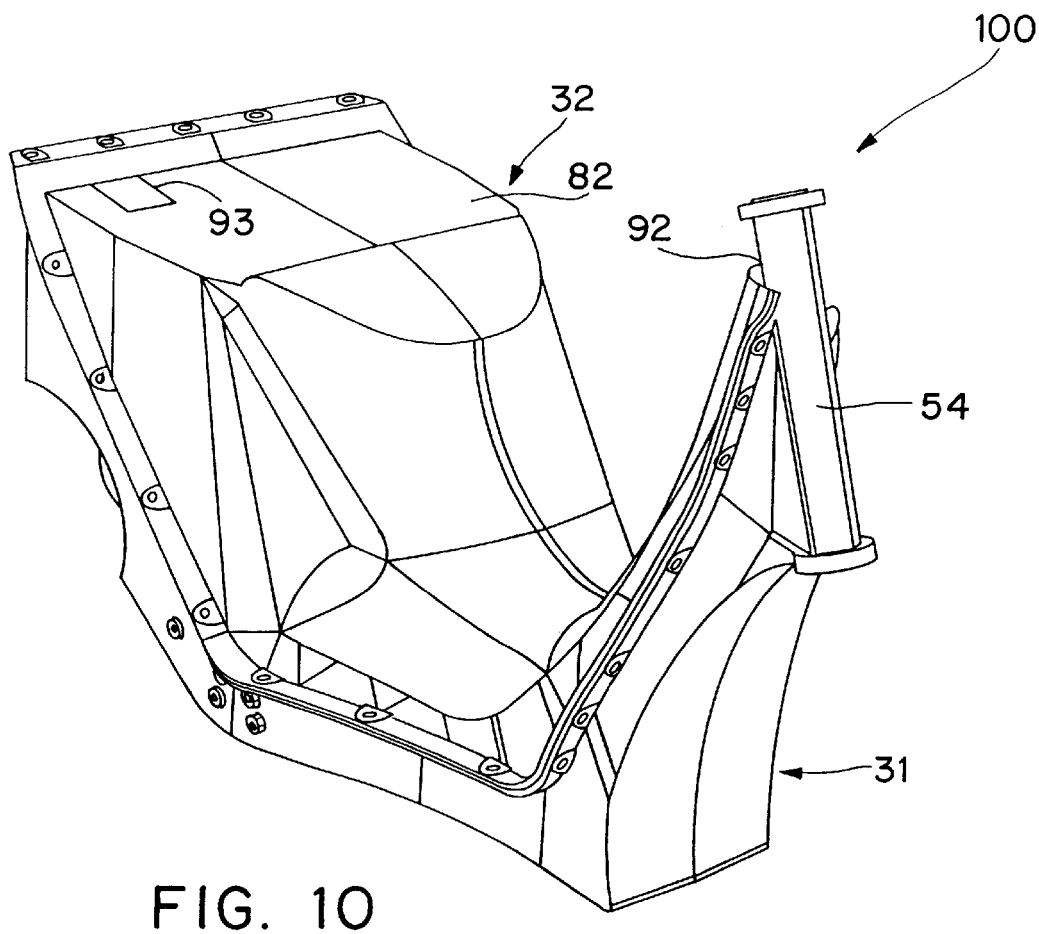
FIG. 10 is a top, front, right-side perspective view of the frame of the present invention in an assembled state.

Referring to FIGS. 8–10, the upper portion 32 of the frame includes a top wall 82, sidewalls 84, and a flange 86. The top wall 82 includes a curved front portion 88, a horizontal rear portion 90, a plurality of edges, and one or more vents 92 and 93. The vents allow escape of hydrogen or other gases that are generated from the batteries to avoid gas buildup and possible explosions resulting from same.

Referring to FIG. 2, the curved front portion 88 is substantially U-shape to form a step-through portion 94. The step-through portion 94 is not obscured by the body panel subassembly 26. The step-through portion 94 allows a rider to stand on one side of the scooter 10 and pass one leg through the step-through portion 94 to the other side of the scooter 10. The horizontal rear portion 90 extends toward the rear end 30 from the curved front portion 88.

The top wall 82 had peripheral side edges A1–A4, B1–B4, and C. The side edges A1–A4 and B1–B4 extend longitudinally along the sides of the top wall 82, and delineate the separation between the top wall 82 and the sidewalls 84. The rear edge C extends transversely along the rear end of the rear portion 90.

Referring to FIGS. 9 and 10, the vent 92 is formed when the upper portion 32 is disposed on the lower portion 31. The vent 92 is the gap between the upper portion 32 and the steering tube 54. The vent 93 is disposed through the top wall 82 of the upper portion 32. The vents 92 and 93 are for venting gases from inside the frame 12. The vents 92 and 93 are located in the upper portion 32 of the frame in order to take advantage of the natural tendency of hydrogen or other gases to rise. Thus, no mechanical means is necessary to remove the gases. The gases simple float upwardly out of the vents 92 and 93. The vents 92 and 93 also act as wire pass through for a wire harness (not shown).

Referring to FIGS. 8 and 9, the sidewalls 84 extends downwardly from the both edges A1–A4 and B1–B4 of the top wall 82 and form an open channel 96 beneath the top wall 82.

The flange 86 extends outwardly along the periphery of the sidewalls 84 and the rear edge C of the top wall 82. The flange 86 includes a plurality of holes 98 at spaced locations. Each hole 98 is reinforced by a surrounding build up of material. The location of the flange holes 98 is intended to align with the location of the flange holes 80 (as shown in FIG. 5) on the lower portion 31 of the frame.

Referring to FIG. 10, the upper portion 32 of the frame is detachably joined to the lower portion 31 of the frame, such that the upper portion 32 covers the cavity 38 (as shown in FIG. 3), and forms a frame assembly 100 with an enclosed chamber (not shown) therein. A gasket (not shown) may be disposed between the flanges 37 and 86 to prevent moisture from entering the enclosed chamber. The upper portion 32 of the frame is detachably joined to the lower portion 31 of the frame using commercially available fasteners (not shown), such as bolts and nuts. Upon forming the assembly 100, the strength of the assembly is substantially greater than the strength of the each of the frame portions prior to being joined. Thus, the structural support provided by the frame assembly 100 is sufficient to handle the static and dynamic loads of the vehicle.

The lower and upper portions 31 and 32 of the frame are preferably made of cast aluminum. Each portion is formed as a single casting using conventional techniques. The recommended aluminum is a 12% Magnesium—Aluminum Alloy. This material was selected for its high ductility, decreased density, and resistance to corrosion. The frame should be dimensioned to be as light as possible, yet provide the necessary strength and stiffness to support the static and dynamic loads on the vehicle without substantial deformation. In one embodiment, the frame has an approximately 3 mils substantially uniform thickness. The thickness varies slightly to account for casting tools. After casting the mating flange surfaces are machined until sufficiently smooth, the bore through the steering tube 54 is bored, and the various holes are drilled into the frame. The vent 93 is milled into the upper portion. In other embodiments, titanium or composite materials may be used for the frame.

Referring to FIGS. 1 and 2, the steering subassembly 14 includes a front fork 200, a front wheel 202, a triple clamp 203, a support member 204, handlebars 206, display units 208, a head light 210, rear view mirrors 212, and a windshield 214. The front wheel 202 is adapted to be rotatably associated with the fork 200. Brakes (not shown) are coupled to the fork 200 to stop rotation of the front wheel 202. The triple clamp 203 connects the fork 200 to the support member 204. The support member 204 connects the triple clamp 203 to the handlebars 206. The handlebars 206 provide a means for steering the vehicle 10 by rotating the front fork 200 and consequently the front wheel 202. The handlebars 206 further include a throttle (not shown) rotatably coupled to the handlebars for actuating the motor. The handlebars 206 also include a brake actuation handle (not shown) mounted thereto for actuating the brakes.

Referring to FIG. 2, the display units 208, head light 210, rear view mirrors 212, and the windshield 214 are supported on either the handlebars 206 or the support member 204. The display units 208 may include various information displays, for example indicator warning lights, a battery gauge, turn signal indicators, and a speedometer.

Referring to FIGS. 1 and 10, the power unit subassembly 16 is a battery pack, which includes a plurality of batteries 300–318. In the present embodiment, the power unit subassembly 16 uses ten 12-volt lead-acid batteries. The batteries are wired together and electrically connected to the motor controller subassembly 20, the motor 402 (as shown in FIG. 12), the vehicle controller subassembly 22, and the components of the steering subassembly 14 that require power. This connection may be through a converter (not shown). Insulation (not shown) may be used with the batteries once they are disposed within the frame 12 to prevent the wires and terminals from coming into contact with other wires, terminals, and the frame. Furthermore, straps (not shown) and the like may be used to secure the batteries within the frame to prevent their movement during operation of the vehicle.

Prior to forming the frame assembly 100 (as shown in FIG. 10), the power unit subassembly 16 is placed in the open cavity 38 of the frame lower portion 31. Upon detachably joining the upper portion 32 to the lower portion 31, the power unit 16 is encased therein. The layout of the batteries must allow the batteries to fit within the frame. The layout must also position the center of gravity of the vehicle in a location and make the power unit narrow enough to allow satisfactory turning performance.

Figure 11:
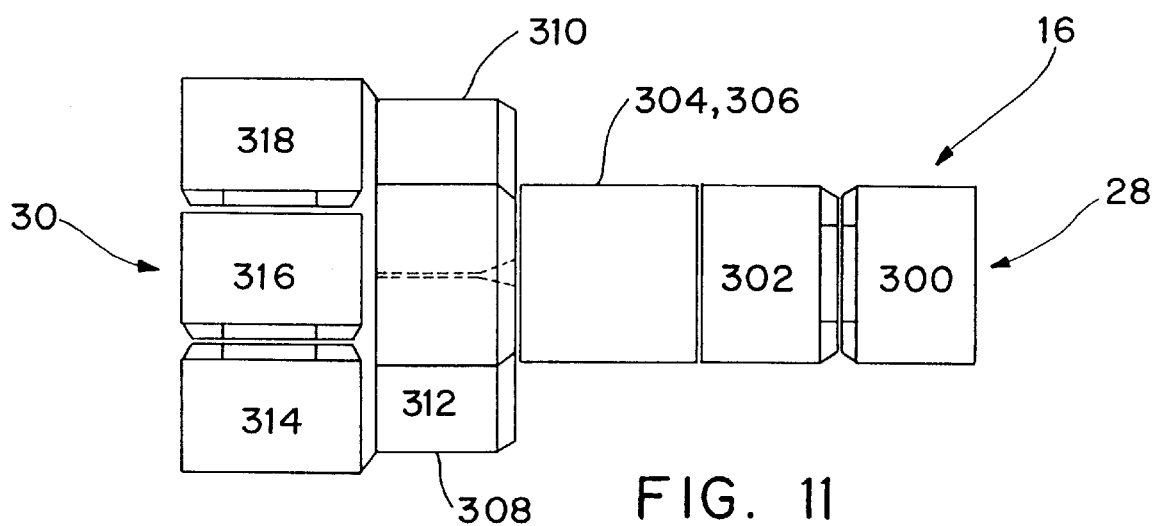
FIG. 11 is a top view of an arrangement of batteries for a power unit subassembly for use with of the present invention.

Referring to FIGS. 1, 4 and 11, the battery layout includes in five longitudinal battery positions. The first battery 300 is closest to the front end 28 of the frame on the first portion 40 of the base. The battery 302 is disposed rearwardly of the first battery 300 on the first portion 40. The third and fourth batteries 304 and 306 are stacked one on top of the other rearwardly of the second battery 302 on the first portion 40. The fifth, sixth, and seventh batteries 308, 310, and 312 are disposed rearwardly of the third and fourth batteries 314 and 316 on the second portion 42. The fifth and sixth batteries 308 and 310 are below the seventh battery 312. The eighth, ninth and tenth batteries 314, 316, and 318 are disposed rearwardly of the batteries 318, 310, and 312. The batteries 314, 316, and 318 are supported by the shoulder 65, and the vertical walls 44 and 46 of the base. Although shown in the above-described layout, the layout of the batteries is not limited to the aforementioned configuration. The batteries may be wired together prior to installation in the frame, so that a modular power unit subassembly is formed prior to installation in the frame. The batteries can also be wired one at a time after being placed in the frame.

Referring to FIGS. 1 and 12, the drive subassembly 18 includes a motor-side swing arm 400, a motor 402 (shown in phantom), a gear assembly 404, a rear wheel 406, a brake assembly 408, and a brake-side swing arm 410. The most preferred drive assembly 18 is the subject of a U.S. Patent Application entitled "Vehicle Drive Wheel Assembly" filed on the concurrently with this application, and which is incorporated by reference in its entirety to the extent necessary to understand this invention.

Referring to FIGS. 7 and 12, the motor-side swing arm 400 includes a motor end 411 and a body end 412. The motor-side swing arm 400 includes the motor 402 therein at the motor end 411, and a transversely extending bore 413 at the body end 412. The swing arm 400 further includes a bracket 414 on the upper surface thereof. The rear wheel 406 is attached to the circumference of the gear assembly 404. The motor 402 is connected to the gear assembly 404 so that the rotational motion of the motor 402 is transferred to the rear wheel 404 at a particular ratio. On the other side of the rear wheel 406, the brake assembly 408 is attached to the gear assembly 404. The brake assembly 408 stops rotation of the rear wheel 406. The brake-side swing arm 410 is connected to the brake assembly 408 and helps support the rear wheel 406. The brake-side swing arm 410 includes a transversely extending bore (not shown) at the body end, and a bracket 415 on the upper surface thereof.

Referring to FIGS. 7 and 12, the body ends 412 of the motor-side swing arm 400 and the brake-side swing arm 410 pivotally coupled to opposite sides of the lower portion 31 of the frame through the bores 72 (as shown in FIG. 3).

This pivotal coupling is achieved by a bearing cone 420, a bearing insert 422, a bearing 424, and a split retaining nut 426 with a clamping screw 428. The bearing cone extends through the bore 72 so that an enlarged flange 430 thereof is within the frame 31 to retain the cone 420 therein. The bearing insert 422 is annular and is disposed upon the free end of the cone 420. The swing arm 400 is disposed on the cone so that the cone 420 extends through the bore 413 in the swing arm 400. The bearing 422 is disposed between within the bore 413 between the swing arm 400 and the bearing insert 422. The split retaining nut 426 is then disposed on the cone and the clamping screw 428 causes the split retaining nut 426 to clamp on to the cone and secure the swing arm 400 thereto. A similar arrangement although not shown is used to retain the brake-side swing arm 410 to the opposite side of the lower portion 31. Thus, pivotably coupling the drive assembly 18 to opposite sides of the lower portion 31 of the frame. The drive assembly 18 can move vertically upwards and downwards as the vehicle moves forward and backward.

Referring to FIGS. 7 and 12, the drive subassembly 18 further includes two shock absorbers 416 and 418 for biasing the rear wheel 406 away from lower portion 32 of the frame. The shock absorber 416 is connected between the lower portion 31 of the frame and the drive assembly 18. The shock absorber 416 is connected to the frame bracket 78 and the motor-side swing arm bracket 414. The shock absorber 418 is connected between the lower portion 31 of the frame and the drive assembly 18. The shock absorber 418 is connected to the frame bracket 79 and the brake-side swing arm bracket 415.

Referring to FIGS. 1 and 11, the motor controller subassembly 20 controls the motor 402 (as shown in FIG. 12) by regulating the application of power from the power unit subassembly 16 to the motor. The motor controller 20 includes a covered housing 500, internal electrical components (not shown), connecting pins 504, retainers 506, and a locking mechanism 507.

The covered housing 500 is formed of an upper wall 508, a spaced lower wall 510, and sidewalls 512. The sidewalls 512 are integrally formed with and perpendicular to the lower wall 510. The lower wall 510 includes cooling fins 513 extending therefrom. The covered housing 500 is formed to enclose the internal electrical components (not shown).

Referring to FIGS. 3 and 7, the sidewalls 512 of the housing are adapted to receive fasteners (not shown) for securing the motor controller 20 to the frame lower portion 31. These fasteners extend through the intermediate sidewalls 62 and 64 through holes 70 and 74, respectively, and through the housing sidewall 512.

Referring to FIGS. 1 and 7, the cooling fins 513 extend longitudinally along the lower wall 510 and provide sufficient surface area to allow passive cooling of the controller internal electrical components.

Referring to FIG. 1, the connecting pins 504 are metal and extend through the housing upper wall 508. The pins 504 are electrically connected to the internal electric components within the housing 500. There are two rows of connecting pins 514 and 516. The second row of pins 516 are disposed rearwardly of the first row of pins 514. The first row 514 includes three spaced pins, which are aligned with the first row of holes 48 (as shown in FIGS. 4 and 6) in the base upon assembly. The second row of pins 516 includes two spaced pins, which are aligned with the second row of holes 50 in the base upon assembly.

Figure 13:
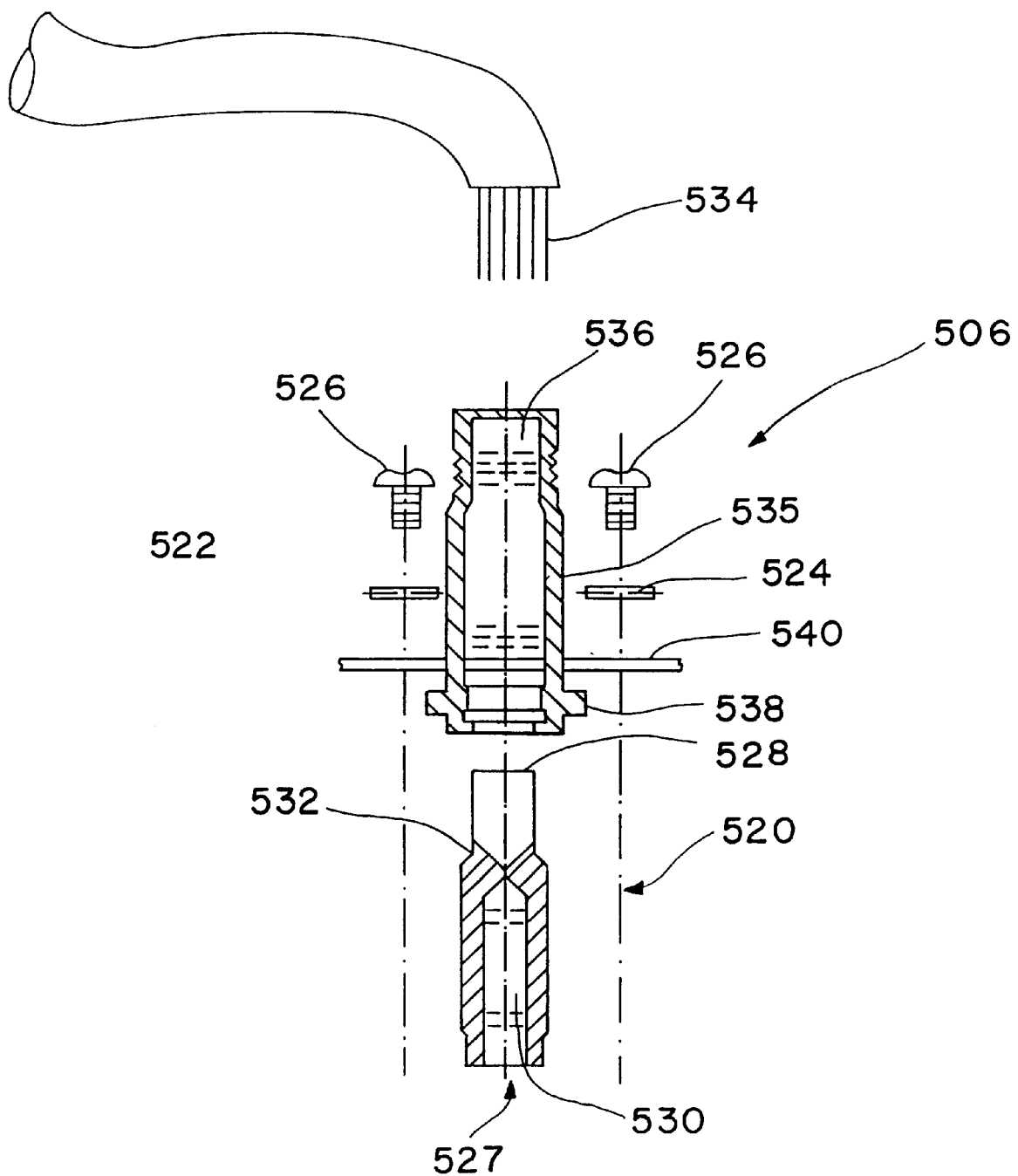
FIG. 13 is an enlarged cross-sectional view of a retainer within the circle 13 of FIG. 7.

Referring to FIGS. 7 and 13, the retainers 506 mechanically couple the motor controller subassembly 20 to frame lower portion 31, and electrically connect the connecting pins 504 to the associated components. The first row of pins 514 will be electrically connected to the motor 402 (as shown in FIG. 12). In this embodiment, since the motor 402 is a three-phase motor there are three pins. The second row of pins 516 will be electrically connected to the power unit subassembly 16 (as shown in FIG. 1).

Referring to FIG. 13, each retainer 506 includes a socket connector 520, an insulator 522, a washer 524, and fasteners

526. The socket connector 520 is a tubular structure having a pin receiving end 527, a spaced wire receiving end 528, and an internal bore 530 extending between the ends. The socket connector 520 is formed of an electrically conductive material and has inwardly extending crimping fingers 532. When a sheathed wire 534 is installed in the wire receiving end 528, the crimping fingers 532 crimp the conductive wire 534 and form an electrical connection between the wire and the socket connector 520.

The pin receiving end 527 is disposed over the free end of the associated connector pin 504 (as shown in FIG. 7) to electrically connect the wire to the pin through the crimping fingers 532 and the socket connector 520.

The insulator 522 includes a tubular sheath 535 including a bore 536 therethrough for coaxially receiving the socket connector 520. The insulator 522 further includes an external lip 538, which is attached to the sheath 535 and extends around the circumference of the sheath 535 adjacent one end. The sheath 535 is formed of an electrically non-conductive material, such as plastic.

The retainers 506 are used with perforated retainer plates, represented by the retainer plate 540. There is one plate for each row of pins. Upon disposing each insulator 522 over the associated socket connector 520, the retainer plate 540 is disposed adjacent the frame base 34 so that the associated row of pins extends therethrough. Each washer 524 is disposed over the retainer plate 540 about the associated pin, and the fasteners 526 are used to connect the retainer plate 540 to the frame. The interference between the lip 538 and the retainer plate 540 thereabove retains the insulators 522 and socket connectors 520 to the associated connector pins 504. The insulators electrically isolate each of the pins and wires attached thereto from one another.

Referring to FIGS. 7 and 12, the wires (not shown) extending from the first row of motor controller pins 514 will run through the bore 72 in the lower portion of the frame into the motor-side swing arm 400 of the drive assembly to connect to the motor 402. The wires, represented by the wire 534, extending from the second row of the motor controller pins 516 will run through the enclosed cavity of the frame to the power unit subassembly 16 (as shown in FIG. 1).

Referring to FIG. 7, the locking mechanisms 507 each are attached to opposite sidewalls 512. Each locking mechanism 507 includes a receiver 550 and a solenoid 552. The receiver activates and deactivates the solenoid 552. The solenoid 552 includes a coil of insulated wire 554 and a slidable plunger 556. In the deactivated position, the plunger 556 extends through the sidewall 512 and engages the lower portion 31 of the frame to prevent the motor controller 20 from being removed from the frame.

When the receiver 550 receives a signal from a transmitter T, which may be a hand held device, the receiver 550 energizes the solenoid 552. This electrically energizes the coil of insulated wire 554, and produces a magnetic field within the wire, the plunger 556 is magnetized and slides to a retracted position within the wire 554. Thus the motor controller 20 can be removed from the frame. A return mechanism (not shown) returns the plunger to the extended position. Similar mechanisms may be positioned at various positions within the vehicle to retain the subassemblies to the frame. In this way the wheels, body panels, and trunk lid can be locked to the frame. The same frequency may be used to transmit signals to each of the solenoids associated with each of the subassembly locking mechanisms, so that each mechanism can be locked simultaneously or different frequencies can be used so that each locking mechanism can be activated one at a time.

Referring to FIGS. 1 and 12, the vehicle controller subassembly 22 includes a micro-controller (not shown) and a plurality of printed circuit boards connected thereto. The circuit boards are designed to perform various control functions for the vehicle 10. The vehicle controller receives status inputs from components of the vehicle, such as sensors (not shown), and sends outputs to various components of the vehicle. The vehicle controller subassembly 22 is electrically connected to the power unit 16 via a converter (not shown), the motor 402, and the motor controller 20, as well as other electrical components of the vehicle. The vehicle controller 22 is disposed within the open cavity 38 in the frame lower portion 31 before securing the upper portion 34 thereto. In other embodiments the vehicle controller can be position within a trunk (not shown).

By way of example, the vehicle controller may receive a torque command input from the throttle (not shown) that indicates the rider desires an increase in speed. The vehicle controller 22 amplifies this input signal and passes it to the motor controller 20. The motor controller 20 regulates the motor 402 causing a change in the torque output. After this change, on a motor shaft (not shown) a speed signal is fed back to the motor controller 20. The motor controller 20 passes the speed signal to the vehicle controller 22, which drives the speedometer display unit 208 (as shown in FIG. 2) to show the increased speed.

The vehicle controller 22 also controls charging of the batteries 300–318 of the power unit 16. When charging the batteries small amount of hydrogen gases may be generated from the batteries. The vents 92 and 93 (as shown in FIG. 10) allow gases generated within the chamber to exit therefrom.

Referring again to FIG. 1, the kickstand subassembly 24 includes a right-side bracket 600 and a left-side bracket (not shown). The bracket 600 includes a center stand 602 and centrally disposed holes 604 therethrough. The center stand 602 is pivotally attached to one end of the bracket 600. The holes 604 are align with the holes 66 in the sidewall of the frame. In this way, conventional fasteners (not shown) can be used to secure the bracket 600 to the exterior of the frame.

The left-side bracket (not shown) is similar to the right-side bracket 600, except it further includes a side stand 606 (shown in phantom). The side stand 606 is pivotally connected to the bracket at the end opposite the center stand end.

The kickstand assembly 24 further includes a connecting member which extends between the free ends of the right-side center stand 602 and the left-side center stand (not shown) to join the center stands together.

Both the center stands, represented by the center stand 602, and the side stand 604 have an extended position and a retracted position. In the extended position, the stands are spaced from the frame base. In the retracted position, the stands are against the frame base. The center stand 602 further includes a spring which extends between the center stand and the frame. The spring (not shown) which biases the center stand into the retracted position.

Referring again to FIG. 2, the body panel subassembly includes a plurality of body panels 700 and a seat 702. The panels 700 are detachably coupled to the lower and upper portions of the frame to provide an aesthetically pleasing, aerodynamic shell over the frame.

The body panels 700 includes a portion for fully enclosing the steering tube 54, steering subassembly 14, and a section of the upper portion of the frame 12. The body panels 700 further include a running board 701 for supporting the feet of a rider. The running boards are detachably coupled to the upper portion of the frame, and are supported on top of the flange 86 of the upper portion. The body panels may include a trunk cover (not shown) for accessing the interior of a trunk (not shown). The trunk may be supported by an extension (not shown) The extension may be formed of an aluminum tubular frame coupled to the frame 12 or an extension which is integrally cast with the frame 12.

As discussed above, the upper portion 32 of the frame is configured and dimensioned to provide a step-through portion 94 for the electrical motor scooter. The step-through portion 94 is not obscured by the body panels 700.

As shown in this embodiment, the seat 702 can accommodate two passengers. In other embodiments, the seat may have a different configurations such as include a back rest or may accommodate a single rider. The seat is disposed on the horizontal rear portion 90 (as shown in FIG. 6), and may be disposed on the trunk extension (not shown).

One advantage of the present invention is that the structure of the frame affords a lightweight, yet structurally sound assembly. In this way, a 36 pound frame supports over 200 pounds of batteries in addition to the other loads of the vehicle. By forming the frame of a conductive material the frame also acts as a heat sink. Heat from the batteries and controllers is radiated through the frame. When the air contacts the frame, some of this heat is removed from the frame by convection. As a result of this radiation and convection, the frame acts as a heat sink and no active cooling mechanism is necessary for the power unit. As an additional advantage, the frame further provides a method of assembly of an electric vehicle, which has modular components, thus the method is quick and efficient.

While it is apparent that the illustrative embodiments of the invention disclosed herein fulfill the objectives stated above, it would be appreciated that numerous modifications and other embodiments may be devised by those skilled in the art. One such modification is providing a frame for a three-wheeled vehicle such as an all-terrain vehicle. The frame would be modified to support two drive subassemblies each of which includes a rear wheel. Therefore, it will be understood that the appended claims are intended to cover all such modifications and embodiments which would come within the spirit and scope of the present invention.

What is claimed is:

1. An electric vehicle frame comprising:
    a lower portion comprising a base with integral upward extending walls forming an open cavity, said walls including a rear wall, a front wall and two spaced sidewalls, wherein said sidewalls and said front wall contact a steering tube forming a step through portion with the respect to the rear wall, said steering tube having a bore therethrough for receiving a steering subassembly; and
    an upper portion detachably joined to the lower portion such that the upper portion covers the cavity and forms a frame assembly which defines an enclosed chamber therein;
    in combination with a power unit subassembly that includes a plurality of batteries;
    wherein the strength of the frame assembly is substantially greater than the strength of each of the portions prior to being joined, and the chamber encloses the power unit subassembly.

2. The electric vehicle frame of claim 1, wherein the lower portion further includes a front vertical endwall, a rear vertical endwall, and two spaced sidewalls extending from the base and contacting the steering tube, and a lower portion flange extending outwardly along the periphery of the lower portion sidewalls, the lower portion flange having a first horizontal portion and at least one first portion angling upwardly from the first horizontal portion; and wherein the upper portion further includes a top wall, two spaced sidewalls, and an upper portion flange, the upper portion sidewalls extending from the top wall, the upper portion flange extending outwardly along the periphery of the upper portion sidewalls, the upper portion flange having a second horizontal portion and at least one second portion angling upwardly from the second horizontal portion, with the upper and lower portion flanges configured and dimensioned to fit together and matingly engage to form the enclosed chamber.

3. The electric vehicle frame of claim 1, in combination with a motor controller subassembly which is coupled to the base.

4. The electric vehicle frame of claim 3, in combination with a drive subassembly that includes a motor, wherein the power unit subassembly is electrically connected to the motor controller subassembly and the drive subassembly.

5. The electric vehicle frame of claim 1, wherein the upper portion includes one or more vents which allow gases generated within the enclosed chamber to exit therefrom.

6. The electric vehicle frame of claim 1, which further comprises running boards detachably coupled to the upper portion.

7. The electric vehicle frame of claim 1, which further comprises a plurality of body panels detachably coupled to the lower portion and the upper portion of the frame assembly.

8. The electric vehicle frame of claim 7, wherein the upper portion is configured and dimensioned to provide a step-through portion for an electric motor scooter wherein the step-through portion of the frame is not obscured by the body panels.

9. The electric vehicle frame of claim 1, wherein the upper and lower portions are made of cast aluminum.

10. A method of assembling an electric vehicle, which comprises:
    providing an electric vehicle frame comprising:
        a lower portion comprising a base with integral upward extending walls forming an open cavity, said walls including a rear wall, a front wall and two spaced sidewalls, and
        an upper portion detachably joined to the lower portion such that the upper portion covers the cavity and forms a frame assembly which defines an enclosed chamber therein, wherein the strength of the frame assembly is substantially greater than the strength of each of the portions prior to being joined;
    providing a plurality of subassemblies including a steering subassembly comprising a steering tube having a bore, a drive subassembly including a motor, a motor controller subassembly for controlling the motor, and a power unit subassembly; wherein said sidewalls and said front wall contact the steering tube forming a step through portion with the respect to the rear wall; and
    coupling the subassemblies to the frame to form the electric vehicle such that the subassemblies are lockably attached to the vehicle frame assembly to prevent removal.

11. A method of assembling an electric vehicle, which comprises:
    providing a plurality of subassemblies including a steering subassembly, a drive subassembly including a motor, a motor controller subassembly for controlling the motor, and a power unit subassembly that includes a plurality of batteries;

providing an electric vehicle frame comprising:

a lower portion comprising a base with integral upward extending walls forming an open cavity, said walls including a rear wall, a front wall and two spaced sidewalls, wherein said sidewalls and said front wall contact a steering tube forming a step through portion with the respect to the rear wall, said steering tube having a bore therethrough for receiving the steering subassembly; and an upper portion configured to be detachably joined to the lower portion such that, when joined, the upper portion covers the cavity and forms a frame assembly which defines an enclosed chamber therein, wherein the strength of the frame assembly is substantially greater than the strength of each of the portions prior to being joined;

joining the upper and lower portions around the power unit subassembly to enclose the plurality of batteries therein; and coupling the remaining subassemblies to the frame assembly to form the electric vehicle.

12. The method of claim 11, wherein the subassemblies further include a vehicle controller subassembly, and the method further comprises the steps of disposing the vehicle controller subassembly within the cavity in the lower portion of the frame before joining the upper portion thereto, and electrically connecting the vehicle controller subassembly to the motor, the motor controller, and the power unit subassemblies.

13. The method of claim 11, which further comprises detachably coupling running boards to the upper portion of the frame, and detachably coupling a plurality of body panels to the frame wherein the upper portion is configured and dimensioned to provide a step-through portion for an electric motor scooter and the step-through portion of the frame is not obscured by the body panels.

14. The method of claim 11, which further comprises pivotably coupling the drive assembly to opposite sides of the lower portion of the frame so that the drive assembly can move vertically upwards and downwards as the vehicle moves forward or backward.

15. The method of claim 14, which further comprises connecting at least one shock absorber between the lower portion of the frame and the drive subassembly.

16. An electric vehicle comprising:

a plurality of subassemblies including a steering subassembly, a drive subassembly including a motor, a motor controller subassembly for controlling the motor, and a power unit subassembly that includes a plurality of batteries;

an electric vehicle frame having a lower portion comprising a base with integral upward extending walls forming an open cavity, said walls including a rear wall, a front wall and two spaced sidewalls, with the lower portion including a steering tube having a bore therethrough for receiving the steering subassembly; and an upper portion detachably joined to the lower portion such that the upper portion covers the cavity and forms a frame assembly which defines an enclosed chamber therein, wherein the strength of the frame assembly is substantially greater than the strength of each of the portions prior to being joined, and the chamber encloses the power unit subassembly wherein said sidewalls and said front wall contact the steering tube forming a step through portion with the respect to the rear wall; and the remaining subassemblies are detachably coupled to the frame to form the vehicle.

17. The vehicle of claim 16, wherein the lower portion of the frame further comprises a steering tube having a bore therethrough for receiving the steering subassembly, and the steering subassembly includes a fork, a front wheel rotatably associated with the fork, handlebars, and a support member connecting the handlebars and fork, wherein and the support member extends through the bore such that the steering assembly is rotatably supported by the steering tube.

18. The vehicle of claim 17, wherein the drive subassembly includes a motor and a rotatable rear wheel driven by the motor, and the sidewalls of the lower portion of the frame pivotally support the drive assembly such that the rear wheel is aligned with the front wheel.

19. The vehicle of claim 18 in the form of an electric motor scooter, which further comprises running boards detachably coupled to the upper portion of the frame, and a plurality of body panels detachably coupled to the lower portion and the upper portion of frame, wherein the upper portion is configured and dimensioned to provide a step-through portion and the step-through portion of the frame is not obscured by the body panels.

20. The vehicle of claim 18, wherein the vehicle further includes two drive subassemblies pivotally supported by the lower portion of the frame.

21. An electric vehicle comprising:

an electric vehicle frame having a lower portion comprising a base with integral upward extending walls forming an open cavity, said walls including a rear wall, a front wall and two spaced sidewalls; and an upper portion detachably joined to the lower portion such that the upper portion covers the cavity and forms a frame assembly which defines an enclosed chamber therein, wherein the strength of the frame assembly is substantially greater than the strength of each of the portions prior to being joined;

a plurality of subassemblies including a steering subassembly comprising a steering tube having a bore, a drive subassembly including a motor, a motor controller subassembly for controlling the motor, and a power unit subassembly, each being detachably coupled to the frame to form the vehicle; wherein said sidewalls and said front wall contact the steering tube forming a step through portion with the respect to the rear wall; and a locking mechanism comprising a solenoid and a slidable plunger actuated by the solenoid, wherein at least one of the subassemblies are lockable to the frame by engagement of the plunger with the frame.

22. The vehicle of claim 21, wherein the vehicle further includes a plurality of locking mechanisms for securing all of the subassemblies to the frame, wherein each locking mechanism further includes a receiver for actuating each solenoid and a transmitter for sending signals to each receiver; wherein upon sending a signal all of the subassemblies are locked to the frame and unlocked therefrom simultaneously.

\* \* \* \* \*